(12) United States Patent
Uchida et al.

(10) Patent No.: US 8,803,390 B2
(45) Date of Patent: Aug. 12, 2014

(54) DYNAMO-ELECTRIC MACHINE

(71) Applicant: Asmo Co., Ltd., Kosai (JP)

(72) Inventors: Masakatsu Uchida, Toyohashi (JP); Yoshimichi Sahara, Toyohashi (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 0 days.

(21) Appl. No.: 14/019,680

(22) Filed: Sep. 6, 2013

(65) Prior Publication Data

US 2014/0009011 A1   Jan. 9, 2014

Related U.S. Application Data

(62) Division of application No. 12/980,640, filed on Dec. 29, 2010, now Pat. No. 8,552,605.

(30) Foreign Application Priority Data

Feb. 2, 2010  (JP) .................. 2010-021275
Feb. 12, 2010  (JP) .................. 2010-028961

(51) Int. Cl.
*H02K 5/173*   (2006.01)
*H02K 23/04*   (2006.01)
*H02K 5/04*    (2006.01)

(52) U.S. Cl.
USPC ................... 310/89; 310/91; 310/90

(58) Field of Classification Search
USPC .............. 310/89, 91, 90, 214, 154.01–154.49
See application file for complete search history.

(56) References Cited

U.S. PATENT DOCUMENTS

| | | | | |
|---|---|---|---|---|
| 4,727,274 A | * | 2/1988 | Adam et al. | 310/239 |
| 5,675,204 A | | 10/1997 | Kusumoto et al. | |
| 5,959,386 A | | 9/1999 | Knight | |
| 6,984,905 B2 | * | 1/2006 | Sano et al. | 310/89 |
| 8,294,311 B2 | * | 10/2012 | Miyoshi et al. | 310/90 |
| 2008/0174191 A1 | * | 7/2008 | Matsubara et al. | 310/89 |

FOREIGN PATENT DOCUMENTS

| | | |
|---|---|---|
| JP | 2008-092641 A | 4/2008 |
| JP | 2008-099523 A | 4/2008 |
| JP | 2009-100573 A | 5/2009 |

OTHER PUBLICATIONS

Office action dated Jan. 17, 2014 in the corresponding CN application No. 201110035657.8 (and English translation).

* cited by examiner

*Primary Examiner* — Tran Nguyen
*Assistant Examiner* — Leda Pham
(74) *Attorney, Agent, or Firm* — Posz Law Group, PLC

(57) ABSTRACT

Engaging protrusions of a lower end housing are axially snap-fitted into through holes, respectively, of a yoke housing to couple therebetween. Each of spacers is circumferentially placed between and is press-fitted between corresponding adjacent two of permanent magnets fixed to an inner peripheral surface of the yoke housing. Each spacer axially contacts a corresponding contact part of the end housing. A lower ball bearing and an upper ball bearing are supported by the lower end housing and an upper end housing, respectively, to rotatably support a shaft. A wave washer is axially positioned between the lower ball bearing and the lower end housing to exert an urging force between the lower end housing and the upper end housing through the shaft.

10 Claims, 6 Drawing Sheets

DYNAMO-ELECTRIC MACHINE

CROSS REFERENCE TO RELATED APPLICATIONS

This application is a divisional of application Ser. No. 12/980,640 filed on Dec. 29, 2010 which is based on and incorporates herein by reference Japanese Patent Application No. 2010-21275 filed on Feb. 2, 2010 and Japanese Patent Application No. 2010-28961 filed on Feb. 12, 2010.

BACKGROUND OF THE INVENTION

1. Field of the Invention

The present invention relates to a dynamo-electric machine.

2. Description of Related Art

In some dynamo-electric machines (e.g., electric motors), an opening of a cup shaped yoke housing is closed by an end housing or a gear housing. For instance, Japanese Unexamined Patent Publication No. 2008-092641A teaches a geared motor that has a cup-shaped yoke housing. Two permanent magnets are fixed to an inner peripheral surface of the yoke housing with aid of two U-shaped spacer springs (fixation springs), each of which is circumferentially positioned between the magnets to circumferentially exert a resilient force against the magnets. An armature is rotatably received in the yoke housing at a location radially inward of the magnets. A gear housing receives a speed reducing gear mechanism, which reduces a speed of rotation transmitted from a rotatable shaft of the armature. The gear housing is fixed to the yoke housing with a plurality of screws. In such an instance, the screws are required to fix the gear housing to the yoke housing, so that the number of components is disadvantageously increased.

In other types of dynamo-electric machines, a casing includes a yoke housing, which is configured into a generally cylindrical tubular body and receives an armature therein at a location radially inward of permanent magnets fixed to an inner peripheral surface of the yoke housing. An opening of the yoke housing is closed with an end housing. The end housing is fixed to the yoke housing by, for example, staking or crimping (i.e., bending of a metal part of one of the yoke housing and the end housing against the other one of the yoke housing and the end housing to secure therebetween) or a snap-fitting without requiring dedicated screws for fixing therebetween.

In the case where the yoke housing and the end housing are assembled together by the staking or crimping, a dedicated jig (device) needs to be provided, and the assembling process may tend to take a longer time.

In the case where the yoke housing and the end housing are fixed together by the snap-fitting, engaging protrusions of the end housing, which radially inwardly protrude, may be snap-fitted into holes of the yoke housing, which are formed in a peripheral wall of the yoke housing (see, for example, Japanese Unexamined Patent Publication No. 2008-099523A). In such a case, it is possible to eliminate the need for the dedicated jig in comparison to the case where the yoke housing and the end housing are fixed together by the staking. Furthermore, it is possible to eliminate the process of the staking at the assembling process, so that the assembling of the yoke housing and the end housing by the snap-fitting can be more easily performed in comparison to the staking.

However, in the case of assembling the yoke housing and the end housing (housing portions) by the snap-fitting, the holes and the engaging protrusions are formed with certain dimensional tolerances to reliably engage between the holes and the engaging protrusions. Therefore, due to the presence of the dimensional tolerances (play), there is a possibility of moving one of the yoke housing and the end housing relative to the other one of the yoke housing and the end housing in the axial direction to cause rattling movement thereof, thereby generating noisy sound at the connection between the yoke housing and the end housing. Particularly, when the dynamo-electric machine is a blower motor of an air conditioning system, which is placed in a passenger compartment of the vehicle, such a noisy sound annoys passengers of the vehicle.

SUMMARY OF THE INVENTION

The present invention addresses the above disadvantages. Thus, it is an objective of the present invention to provide a dynamo-electric machine that is adapted to limit or minimize generation of a noise at a connection between housing portions of a casing, which are snap-fitted together.

According to the present invention, there is provided a dynamo-electric machine, which includes a casing, a plurality of permanent magnets, an armature and a plurality of spacers. The casing includes a first housing portion and a second housing portion. The first housing portion includes an engaging part. The second housing portion includes an engaging part. The engaging part of the second housing portion is axially snap-fitted to the engaging part of the first housing portion to couple the second housing portion to one end part of the first housing portion. The permanent magnets are fixed to an inner peripheral surface of the first housing portion and are spaced from one after another in a circumferential direction. The armature is rotatably placed radially inward of the plurality of permanent magnets. Each of the plurality of spacers is circumferentially placed between and is press-fitted between corresponding adjacent two of the plurality of permanent magnets. Each of the plurality of spacers axially contacts a corresponding contact part of the second housing portion to limit axial movement of the corresponding contact part of the second housing portion toward the spacer.

Furthermore, there is also provided a dynamo-electric machine, which includes a casing, a plurality of permanent magnets, an armature and a resilient urging member. The casing includes a first housing portion and a second housing portion. The first housing portion supports a first ball bearing and includes an engaging part. The second housing portion supports a second ball bearing and includes an engaging part. The engaging part of the second housing portion is axially snap-fitted to the engaging part of the first housing portion to couple the second housing portion to one end part of the first housing portion. The permanent magnets are fixed to an inner peripheral surface of the first housing portion and are spaced from one after another in a circumferential direction. The armature is rotatably placed radially inward of the plurality of permanent magnets and includes a rotatable shaft, which is rotatably supported by the first ball bearing and the second ball bearing. The resilient urging member is axially positioned between the second ball bearing and a support wall of the second housing portion to exert an axial urging force, which urges the second ball bearing and the support wall of the second housing portion axially away from each other. The axial urging force of the resilient urging member axially urges the second ball bearing together with the rotatable shaft and the first ball bearing away from the support wall to axially urge the first housing portion away from the second housing portion through the first ball bearing. An engaging surface of the engaging part of the first housing portion is axially urged against an engaging surface of the engaging part of the second housing portion by the urging force of the resilient urging member conducted to the first housing portion through the first ball bearing.

BRIEF DESCRIPTION OF THE DRAWINGS

The invention, together with additional objectives, features and advantages thereof, will be best understood from the following description, the appended claims and the accompanying drawings in which:

FIG. 7A is a cross-sectional view of a dynamo-electric machine according to a second embodiment of the present invention;

FIG. 7B is a partial enlarged view showing a part of FIG. 7A;

FIG. 7C is a partial enlarged cross-sectional view of the dynamo-electric machine taken at a different angle, which is different from that of FIG. 7A.

DETAILED DESCRIPTION OF THE INVENTION (First Embodiment)

A first embodiment of the present invention will be described with reference to FIGS. 1 to 6.

Figure 1:
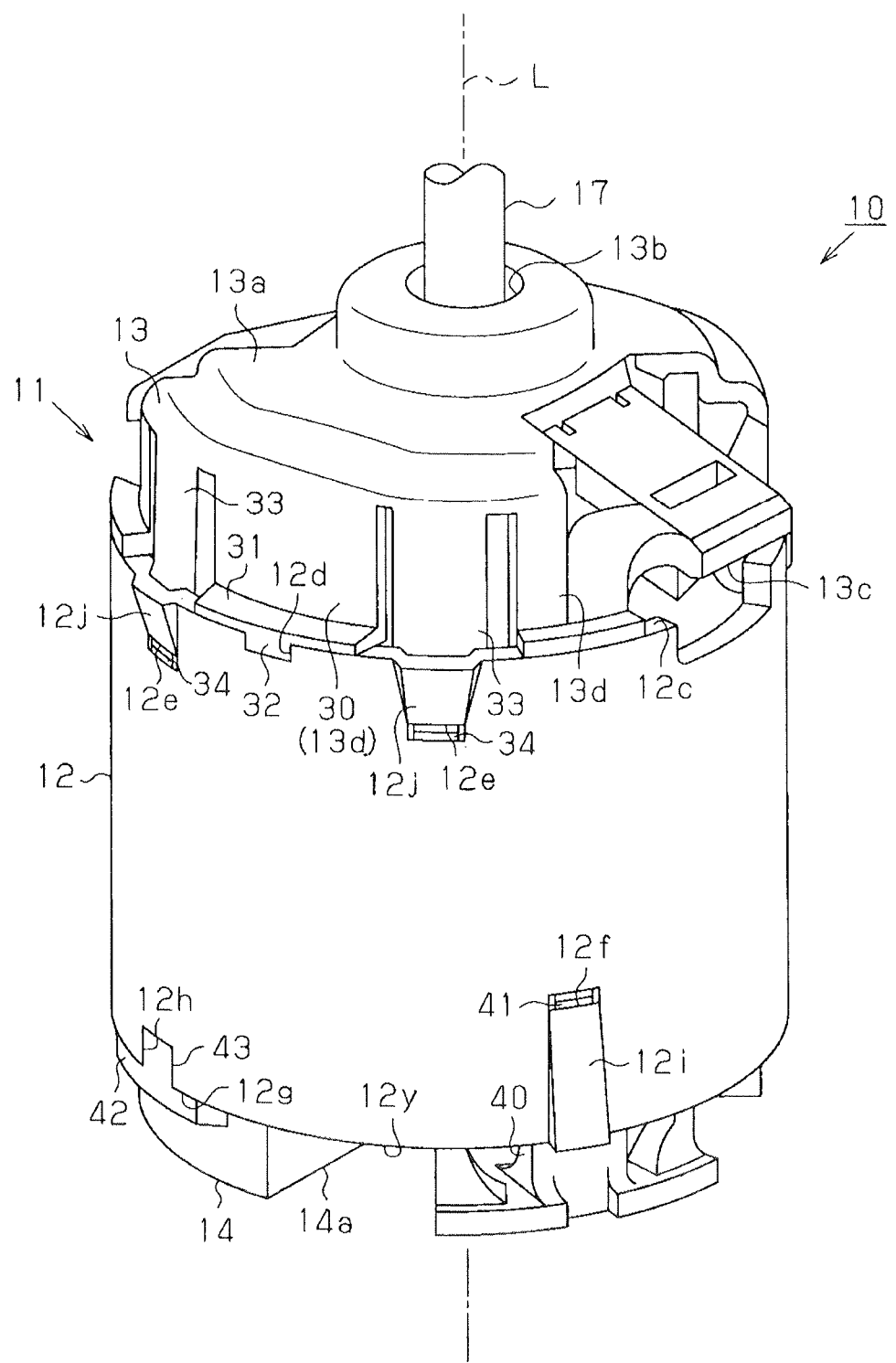
FIG. 1 is a perspective view of a dynamo-electric machine according to a first embodiment of the present invention.
Figure 2:
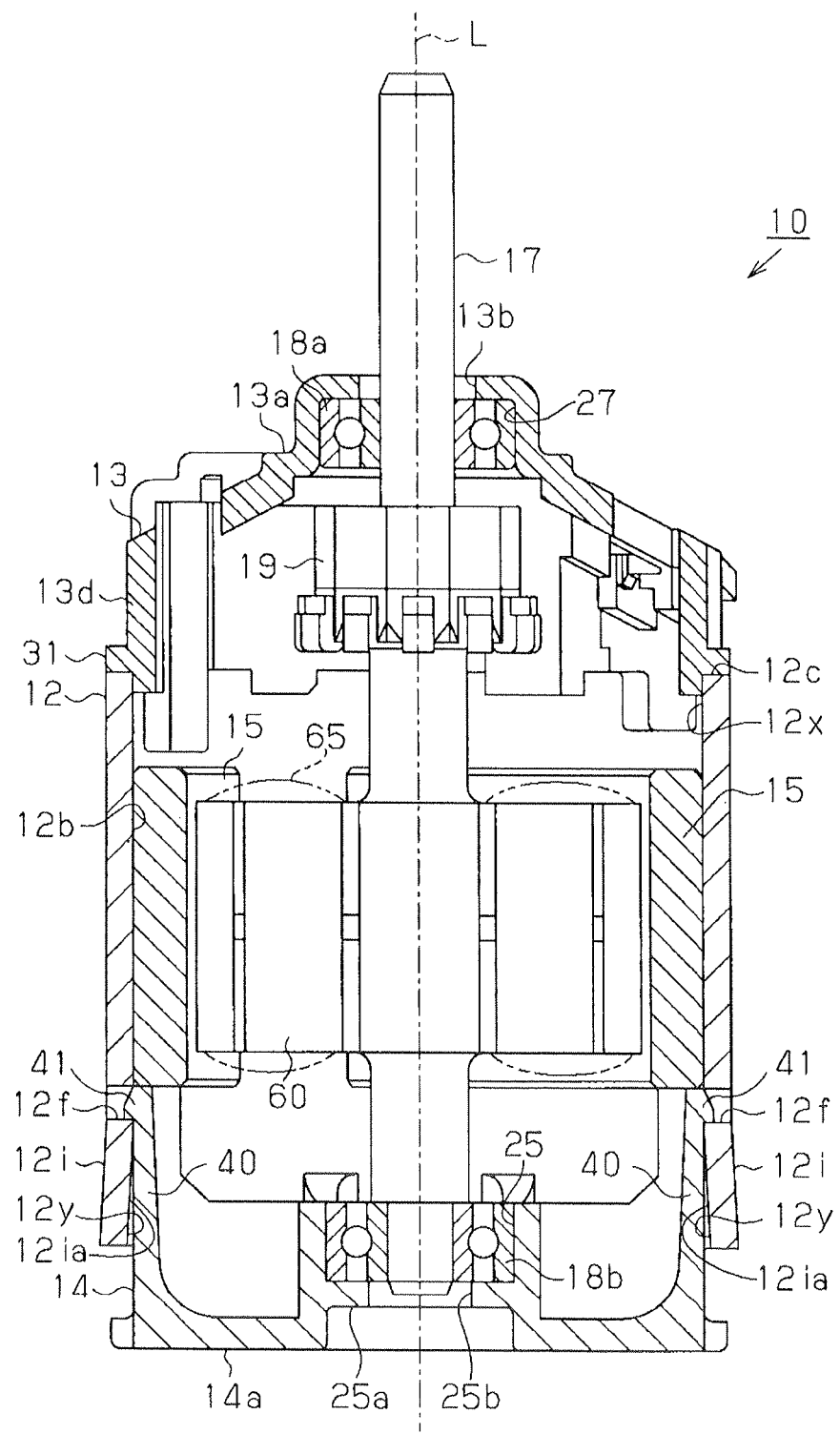
FIG. 2 is a cross-sectional view of the dynamo-electric machine of the first embodiment.

FIG. 1 is a perspective view of a dynamo-electric machine according to the first embodiment. In this particular embodiment, the dynamo-electric machine 10 is an electric motor, which is used as a blower motor of an air conditioning system of a vehicle (e.g., an automobile). With reference to FIGS. 1 and 2, a casing (case) 11 of the dynamo-electric machine 10 of the present embodiment includes a cylindrical tubular yoke housing 12, an upper end housing 13 and a lower end housing 14. The yoke housing 12 is made of a magnetic material (e.g., iron). The upper and lower end housings 13, 14 are made of a resin material. The upper and lower end housings 13, 14 close upper and lower openings 12x, 12y, respectively, of the yoke housing 12 located at two opposed axial ends of the yoke housing 12, which are opposed to each other in an axial direction, a direction of an axis L of the yoke housing 12 (also serving as a rotational axis of an armature 60 described below). Each of the upper and lower end housings 13, 14 are installed to the yoke housing 12 through a corresponding snap-fit structure described later.

As shown in FIG. 2, two permanent magnets 15 are fixed to an inner peripheral surface 12b of the yoke housing 12. Furthermore, the armature 60 is rotatably supported on a radially inner side of the magnets 15 in the yoke housing 12.

Two spacers (also referred to as spacer members or spacer springs) 20 are placed such that each spacer 20 is circumferentially held between the magnets 15 and exerts a resilient force in the circumferential direction of the yoke housing 12.

Figure 3:
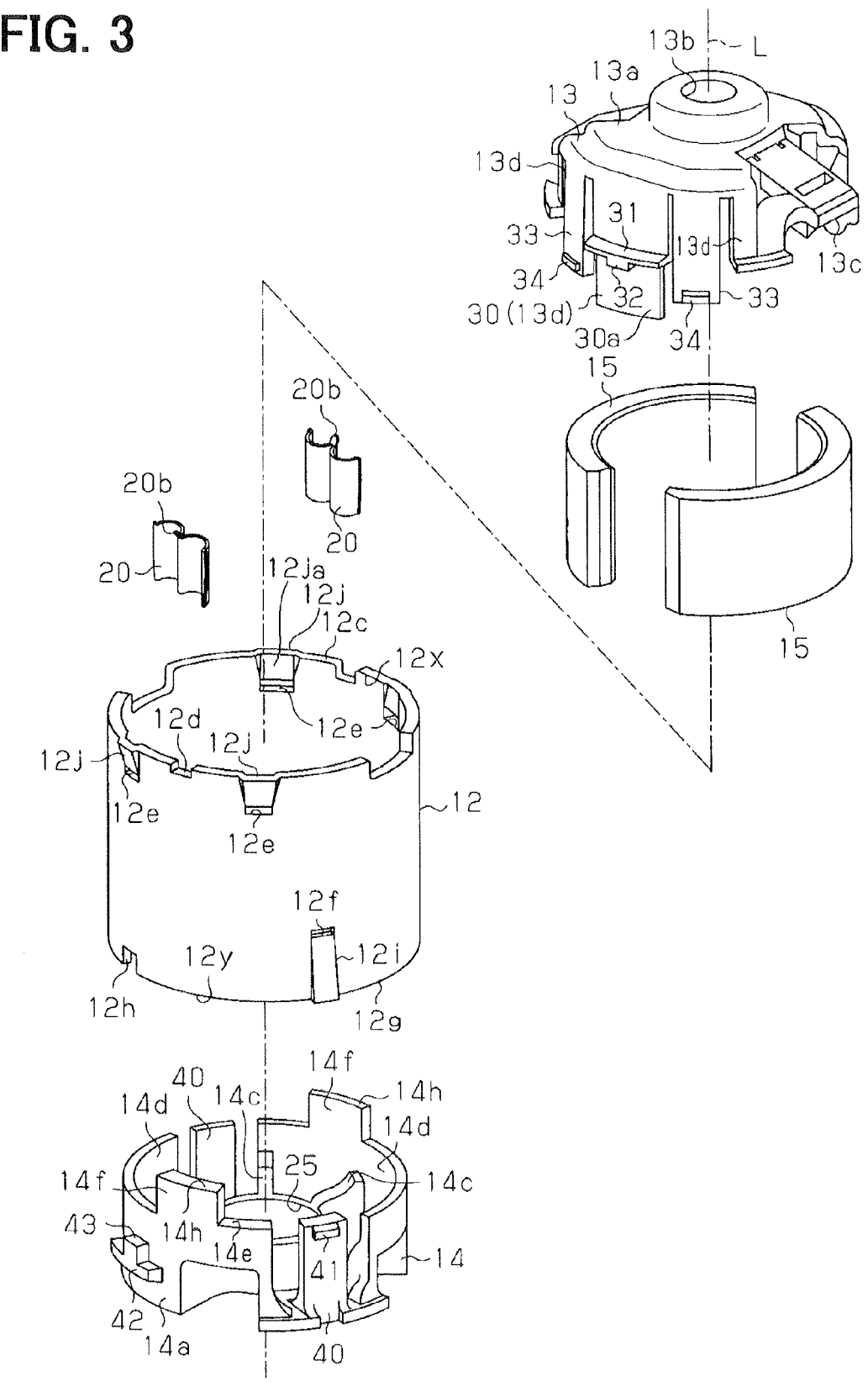
FIG. 3 is an exploded perspective view showing a structure of a casing of the dynamo-electric machine of the first embodiment.
Figure 5:
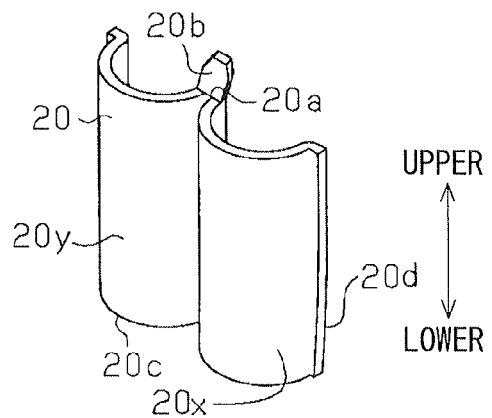
FIG. 5 is a perspective view of a spacer of the dynamo-electric machine of the first embodiment.
Figure 6:
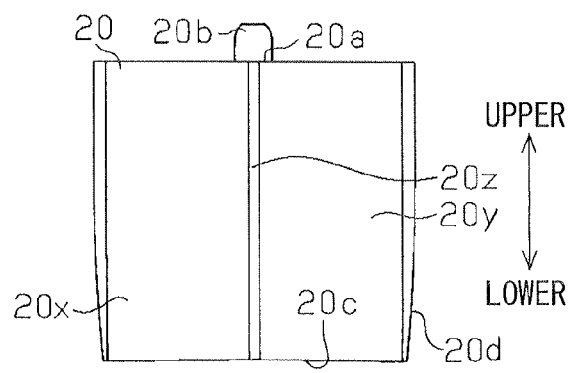
FIG. 6 is a front view of the spacer shown in FIG. 5.

With reference to FIGS. 3 and 5, each spacer 20 is made of a metal material (e.g., spring steel, iron steel) and includes a plurality (two in this instance) of semicylindrical segments 20x, 20y. The semicylindrical segments (first and second semicylindrical segments) 20x, 20y are joined together at adjacent circumferential ends thereof, i.e., at a connection 20z. Each semicylindrical segment 20x, 20y is radially inwardly convex toward the axis (rotational axis or central axis) L of a rotatable shaft 17 of the armature 60. These spacers 20 exert a predetermined resilient force (urging force) in the circumferential direction between the magnets 15 to hold the magnets 15. Each spacer 20 further includes a limiting portion 20b that is formed at the connection 20z, more specifically, at a circumferential center area of one axial end part 20a of the spacer 20, which is opposite from the lower end housing 14 in the direction of the axis L. The limiting portion 20b of the spacer 20 is slidable along the inner peripheral surface 12b of the, yoke housing 12 at the time of installing the spacer 20 along the inner peripheral surface 12b of the yoke housing 12. The limiting portion 20b projects radially outwardly and axially upwardly from the rest of the end part 20a of the spacer 20 in an oblique direction, which is away from the lower end housing 14 and is oblique to the direction of the axis L. Furthermore, as shown in FIG. 6, a leading end part (insertion end part) 20d of the spacer 20 is tapered toward its leading end, i.e., its lower end (toward the lower end housing 14 side thereof) in an installation direction (inserting direction) of the spacer 20 that is generally parallel to the direction of the axis L. In other words, a circumferential size (circumferential width) of the spacer 20 is reduced toward its leading end.

The armature 60 includes the rotatable shaft 17, which extends along the axis L. The rotatable shaft 17 is rotatably supported by two ball bearings, i.e., upper and lower ball bearings (first and second ball bearings) 18a, 18b, which are placed at a center part (specifically, a bearing holding portion 27 described below) of the upper end housing 13 and a center part (specifically, a bearing holding portion 25 described below) of the lower end housing 14, respectively. Furthermore, a commutator 19 is fixed to the rotatable shaft 17. The upper end housing 13 includes a plurality (two in this instance) of brush holders 13c, each of which radially slidably receives a corresponding one of a plurality of brushes (not shown), so that the brushes slidably contact an outer peripheral surface (commutator segments) the commutator 19. When coils 65 of the armature 60 are energized through the brushes and the commutator 19 upon receiving an electric power from an external electric power source, such as a vehicle battery (not shown), the armature 60 and the rotatable shaft 17 are rotated together.

Next, the structure of the casing 11 of the present embodiment will be described in detail.

The upper end housing 13 has a receiving hole 13b that axially penetrates through a center of a base part of a main body 13a of the upper end housing 13. The main body 13a is configured into a generally circular disc form. The rotatable shaft 17 is received through the receiving hole 13b. The ball bearing 18a is received in the bearing holding portion 27 located at the center part of the upper end housing 13 and rotatably supports the upper part of the rotatable shaft 17. The brush holders 13c, each of which receives the corresponding brush from a radially outer side thereof, are arranged one after another at generally 180 degree intervals in the circumferential direction.

The upper end housing 13 further includes a plurality (four in this instance) of side walls 13d, each of which axially projects from an outer peripheral edge of the main body 13a toward the lower end housing 14 and contacts an upper opening end part 12c of the yoke housing 12. Each of diametrically opposed two (only one is shown in FIG. 1 or 3) of these side walls 13d includes a projection 31. The projection 31 radially outwardly projects from an axial intermediate location of the side wall 13d and has a protrusion 32, which protrudes downwardly from a lower surface of the projection 31 in the direction of the axis L. Each protrusion 32 is fitted into a corresponding notch (recess) 12d, which is recessed in the upper opening end part 12c of the yoke housing 12 in the direction of the axis L toward the lower end housing 14. Furthermore, a plurality (four in this instance) of projecting pieces 33 axially projects from the outer peripheral edge of the main body 13a in a manner similar to that of the side walls 13d. Each of the projecting pieces 33 is circumferentially placed between corresponding adjacent two of the side walls 13d. Each of these four projecting pieces 33 (only two are shown in FIG. 3) has a protrusion 34, which radially outwardly protrudes from a distal end part of the projecting piece 33 and serves as an engaging part. The protrusion 34 of each projecting piece 33 is securely engaged with, i.e., snap-fitted to a corresponding one of a plurality (four in this instance) of upper through holes 12e, each of which radially extends through a peripheral wall of the yoke housing 12 at a corresponding predetermined location in the peripheral wall of the yoke housing 12. With this snap-fit structure (i.e., the protrusions 34 of the projecting pieces 33 and the upper through holes 12e, which are snap-fitted together), the upper end housing 13 is securely installed to, i.e., coupled to the yoke housing 12.

An axially projecting portion 30a of each of the two diametrically opposed side walls 30, i.e., a distal end portion of the side wall 30 is circumferentially placed between the magnets 15 at the time of assembling the upper end housing 13 to the yoke housing 12. In this way, the positional deviation of the upper end housing 13 in the circumferential direction can be limited.

A plurality (two in this instance) of insertion portions 12j is formed at the upper opening 12x of the yoke housing 12 to receive and guide the engaging protrusions 34, respectively, at the time of installing the protrusions 34 into the upper through holes 12e during the period of installing of the upper end housing 13 to the yoke housing 12. Each insertion portion 12j is tapered such that across-sectional area (opening area) of the insertion portion 12j increases from one axis side, at which the lower end housing 14 is located, toward the other axial side, at which the upper opening 12x of the yoke housing 12 is located, in the direction of the axis L. In other words, a guide wall 12ja of the insertion portion 12j, which guides the corresponding engaging protrusion 34 at the time of installation, is tilted such that a radial distance, which is radially measured from the axis L to the guide wall 12ja, increases from the lower end housing 14 side toward the upper end housing 13 side in the direction of the axis L.

The bearing holding portion 25, which is configured into a cup shape (i.e., having a bottom wall and a peripheral wall), is formed at a center part of a main body 14a of the lower end housing 14. The main body 14a is configured into a circular disc form. A thorough hole 25b is formed at a base part (support wall) 25a of the bearing holding portion 25 to receive the lower end portion of the rotatable shaft 17. A plurality of ribs 14c is formed in the lower end housing 14 such that the ribs 14c are arranged one after another in the circumferential direction and radially outwardly extend from the bearing holding portion 25. Furthermore, a plurality (two in this instance) of side walls 14d is formed in the lower end housing 14 such that each side wall 14d axially projects from an outer peripheral edge of the main body 14a toward the upper end housing 13. Each of these two side walls 14d has an axially extending portion 14f, which axially extends from an axial end part 14e of the side wall 14d. The extending portions 14f of the side walls 14d are placed one after another at generally 180 degree intervals. Each of the extending portions 14f is circumferentially placed between the magnets 15 at the time of assembling the magnets 15 to the yoke housing 12.

Furthermore, a plurality (two in this instance) of projecting pieces 40 is formed in the lower end housing 14 such that each of the projecting pieces 40 is circumferentially placed between the side walls 14d and axially projects from the outer peripheral edge of the main body 14a to an axial location where the axial end part 14e of the side wall 14d is located. Each projecting piece 40 has an engaging protrusion 41, which radially outwardly protrudes and serves as an engaging part. The engaging protrusion 41 of each projecting piece 40 is securely engaged with, i.e., snap-fitted to a corresponding one of a plurality (two in this instance) of lower through holes 12f, each of which radially extends through the peripheral wall of the yoke housing 12 at a corresponding predetermined location in the peripheral wall of the yoke housing 12. With this snap-fit structure (i.e., the engaging protrusions 41 of the projecting pieces 40 and the lower through holes 12f, which are snap-fitted together), the lower end housing 14 is securely installed to, i.e., coupled to the yoke housing 12. Each of the side walls 14d of the lower end housing 14 has a projection 42 (only one of the projections 42 of the side walls 14d being shown in FIG. 1 or 3). The projection 42 radially outwardly projects from a radially outer surface of the side wall 14d and has a protrusion 43, which protrudes from an upper surface of the projection 42 in the direction of the axis L1. Each of the protrusions 43 is fitted into a corresponding one of a plurality (two in this instance) of lower notches 12h, which is axially recessed in the lower opening end part 12g of the yoke housing 12 in the direction of the axis L. A plurality (two in this instance) of insertion portions 12i is formed at the lower opening 12y of the yoke housing 12 to receive the engaging protrusions 41, respectively. Each insertion portion 12i is tapered such that a cross-sectional area (opening area) of the insertion portion 12i increases from one axial side, at which the upper end housing 13 is located, toward the other axial side, at which the lower opening 12y of the yoke housing 12 is located, in the direction of the axis L. In other words, a guide wall 12ia of the insertion portion 12i, which guides the corresponding engaging protrusion 41 at the time of installation, is tilted such that a radial distance, which is radially measured from the axis L to the guide wall 12ia increases from the upper end housing 13 side toward the lower end housing 14 side in the direction of the axis L.

Next, an assembling process of the lower end housing 14 to the yoke housing 12 will be described.

The lower end housing 14 is fitted into the lower opening 12y of the yoke housing 12. Specifically, the protrusions 43 of the lower end housing 14 are circumferentially positioned relative to the lower notches 12h of the yoke housing 12, so that the protrusions 43 are axially aligned with the lower notches 12h, respectively. Then, the lower end housing 14 is fitted to the yoke housing 12 in the direction of the axis L, so that the engaging protrusions 41 of the projecting pieces 40 are engaged with, i.e., press-fitted to the lower through holes 12f, respectively, of the yoke housing 12 upon being guided along the insertion portions 12i, respectively. Thereby, the lower end housing 14 is installed to the yoke housing 12 through the snap-fit structure. As discussed above, each of the insertion portions 12i is tapered such that the cross-sectional area (opening area) of the insertion portion 12i increases toward the lower opening 12y of the yoke housing 12 in the direction of the axis L. Therefore, at the time of installing the lower end housing 14 to the yoke housing 12 by inserting the segment of the lower end housing 14 into the lower opening 12y of the yoke housing 12, the engaging protrusions 41 are smoothly guided by the guide walls 12ia, respectively, and are inserted into the insertion portions 12i, respectively. Thereby, the engaging protrusions 41 do not interfere with the installation of the lower end housing 14 to the yoke housing 12. Furthermore, at the time of detaching the lower end housing 14 from the yoke housing 12 for a purpose of maintenance work or repair work after a long time use, each engaging protrusion 41 may be radially inwardly pushed through the corresponding through hole 12f with a jig to disengage the engaging protrusions 41 from the through holes 12f, so that the lower end housing 14 may be easily removed from the yoke housing 12 with a hand. This is also true for the upper end, housing 13. That is, the upper end housing 13 can be installed and detached relative to the yoke housing in a manner similar to that of the lower end housing 14

Next, the magnets 15 are installed to and secured to the inner peripheral surface 12b of the yoke housing 12. At this time, each of the extending portions 14f of the lower end housing 14 is circumferentially placed between the magnets 15 upon the installation of the magnets 15 to the inner peripheral surface 12b of the yoke housing 12. Here, it should be noted that the magnets 15 may be installed to the inner peripheral surface 12b of the yoke housing 12 before the time of engaging the engaging protrusions 41 of the projecting pieces 40 into the lower through holes 12f, respectively, of the yoke housing 12, i.e., before the time of installing the lower end housing 14 to the yoke housing 12.

Figure 4A:
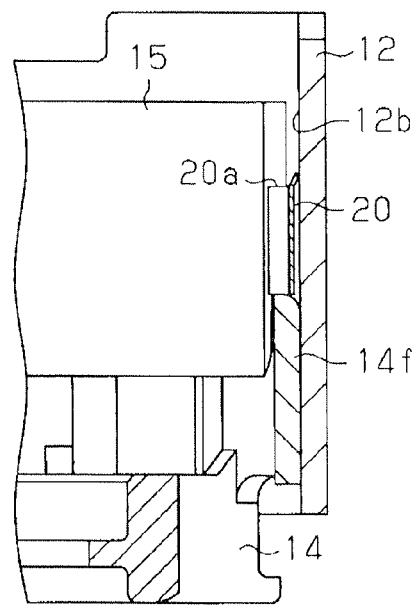
FIG. 4A is a partial cross-sectional view of the casing of the dynamo-electric machine of the first embodiment.
Figure 4B:
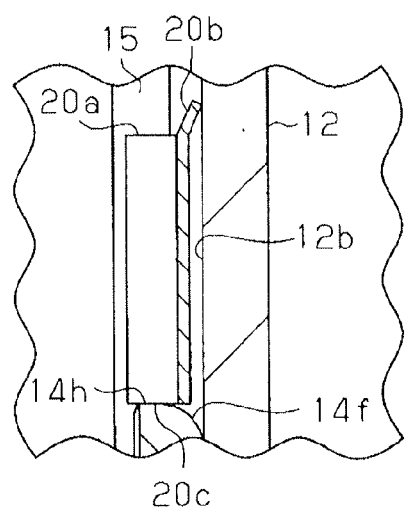
FIG. 4B is a partial enlarged cross-sectional view showing a portion of FIG. 4A.

Next, each of the spacers 20 is press-fitted between the magnets 15. At this time, each spacer 20 is press-fitted such that the spacer 20 axially slides on the inner peripheral surface 12b of the yoke housing 12 until an end surface 20c of a leading end part 20d of the spacer 20, which is axially opposite from the limiting portion 20b, contacts an upper end (serving as a contact part) 14h of the corresponding extending portion 14f of the lower end housing 14, as shown in FIGS. 4A and 4B. In FIGS. 4A and 4B, the armature 60 is not shown for the sake of simplicity. As discussed above, the spacer 20 is tapered toward its leading end (toward the lower end housing 14 side end thereof, i.e., toward the end surface 20c of the spacer 20), so that the spacer 20 can be easily inserted between the magnets 15. Furthermore, due to the press-fitting of the spacer 20 between the magnets 15, the axial movement of the spacer 20 can be limited. Therefore, it is possible to limit an axial positional deviation (specifically, rattling) of the lower end housing 14, which contacts the end surfaces 20c of the spacers 20. Furthermore once the end surfaces 20c of the spacers 20 contact the upper ends 14h, respectively, of the extending portions 14f of the lower end housing 14, the limiting portions 20b of the spacers 20 engage or bite the inner peripheral surface 12b of the yoke housing 12 to resist removal of the spacers 20 toward the upper opening 12x of the yoke housing 12. That is, the limiting portions 20b of the spacers 20 are anchored to the inner peripheral surface 12b of the yoke housing 12. Therefore, even in the case where the engaging protrusions 41 of the, projecting pieces 40 are engaged with the lower through holes 12f, respectively, of the yoke housing 12, i.e., the lower end housing 14 and the yoke housing 12 are assembled together through the snap-fit structure, it is possible to limit the generation of the rattling movement. Thus, it is possible to limit or minimize the generation of the noise at the connection between the yoke housing 12 and the lower end housing 14, which are snap-fitted together.

Furthermore, even in the case where the spacer 20 slides on the inner peripheral surface 12b of the yoke housing 12 at the time of axially inserting the spacer 20 through the upper opening 12x of the yoke housing 12, the limiting portion 20b shows the minimum interference since the limiting portion 20b extends on the axial side, which is opposite from the lower end housing 14, i.e., opposite from the inserting direction of the spacer 20 into the yoke housing 12.

Next, advantages of the first embodiment will be described.

(1) According to the present embodiment, the magnets 15 and the spacers 20 are provided to the inner peripheral surface 12b of the yoke housing 12. The magnets 15 are arranged one after another along the inner peripheral surface 12b of the yoke housing 12 in the circumferential direction, and each of the spacers 20 is circumferentially placed between and is press fitted between the magnets 15. Each spacer 20 is constructed such that the spacer 20 contacts the upper end 14h of the corresponding extending portion 14f of the lower end housing 14 at the time of installation of the spacer 20. That is, the spacer 20, which is press-fitted between the magnets 15, contacts the lower end housing 14. Thereby, frictional forces between the magnets 15 and the spacer 20 can limit the axial positional deviation (rattling) of the lower end housing 14. Furthermore, since the spacers 20 limit the axial movement of the lower end housing 14, the spacers 20 also limit circumferential positional deviation of the lower end housing 14.

(2) Each spacer 20 has the limiting portion 20b, which is engaged with the inner peripheral surface 12b of the yoke housing 12 to limit axial movement of the spacer 20 toward the upper opening 12x of the yoke housing 12 at the time when the spacer 20 contacts the upper end 14h of the extending portion 14f of the lower end housing 14. In this way, at the time of engagement by the snap-fit structure, the upper end 14h of the extending portion 14f of the lower end housing 14 contacts the spacer 20, and the axial movement of the spacer 20 is limited by the limiting portion 20b. Thereby, the relative axial positional deviation (i.e., the axial rattling) between the lower through holes 12f and the engaging protrusions 41 can be more suitably limited.

(3) The limiting portion 20b of each of the spacers 20 projects radially outwardly and axially upwardly from the rest of the end part 20a of the spacer 20 in the oblique direction, which is away from the lower end housing 14 and is oblique to the direction of the axis L. With this construction, even when the spacer 20 is urged by the upper end 14h of the extending portion 14f of the lower end housing 14 in the axial direction opposite from the lower end housing 14, the limiting portion 20b is engaged with, i.e., bites against the inner peripheral surface 12b of the yoke housing 12 to limit the movement of the spacer 20 by exerting the resilient urging force against the upper end 14h of the extending portion 14f from the obliquely bent limiting portion 20b. Therefore, the relative axial positional deviation (i.e., the axial rattling) between the lower through holes 12f and the engaging protrusions 41 can be suitably limited. Also, at the time of installing the spacer 20 into the yoke housing 12 through the upper opening 12x of the yoke housing 12, which is located on the side opposite from the lower end housing 14, the distal end (the upper, end in, for example, FIG. 4A or 4B) of the limiting portion 20b does not generate a large resistance because of its projecting direction, which is opposite from the inserting direction of the spacer 20. Therefore, the spacer 20 can be easily inserted into the yoke housing 12.

(4) The engaging protrusion 41 of each of the projecting pieces 40 is formed such that the engaging protrusion 41 protrudes radially outwardly and is engaged with the corresponding lower through hole 12f of the yoke housing 12 upon installation of the lower end housing 14 to the yoke housing 12. The insertion portions 12*i*, which receive the engaging protrusions 41, respectively, are formed at the lower opening 12*y* of the yoke housing 12, which is located on the side where the lower end housing 14 is located Each insertion portion 12*i* is tapered such that the cross-sectional area (opening area) of the insertion portion 12*i* increases toward the lower opening 12*y* of the yoke housing 12 in the direction of the axis L. When the insertion portion 12*i* is tapered such that the cross-sectional area (opening area) of the insertion portion 12*i* increases toward the lower opening 12*y* of the yoke housing 12 in the direction of the axis L, the corresponding engaging protrusion 41 can be smoothly inserted into the insertion portion 12*i* and thereby does not interfere with the installation of the lower end housing 14 to the yoke housing 12.

(Second Embodiment)

Figure 8:
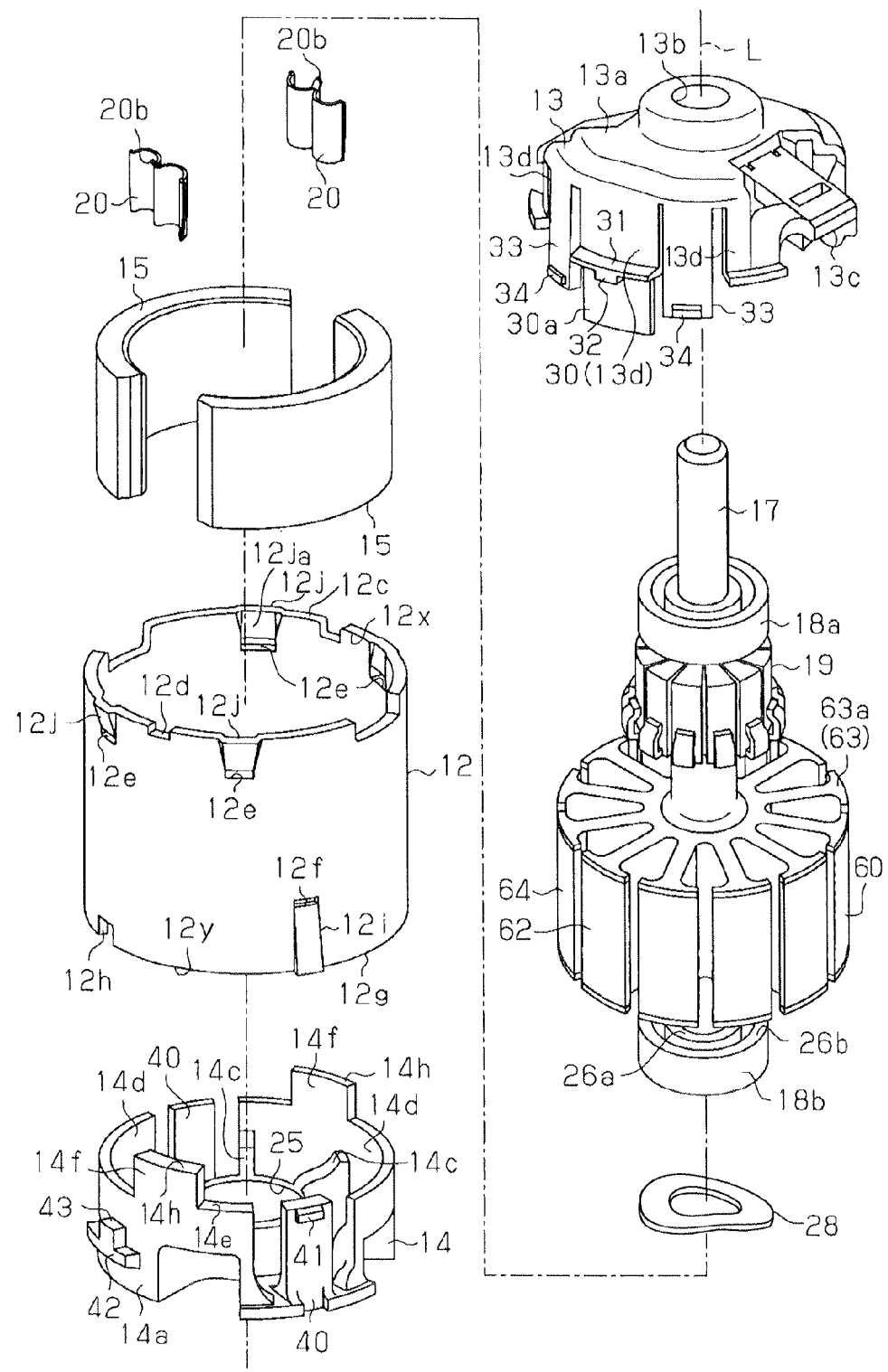
FIG. 8 is an exploded perspective view of the dynamo-electric machine of the second embodiment.

Now, a dynamo-electric machine 10 according to a second embodiment of the present invention will be described with reference to FIGS. 7A to 8. The dynamo-electric machine 10 of the second embodiment is similar to that of the first embodiment except the structure of the armature 60 and its associated structure discussed below. Therefore, in the following discussion, components, which will be similar to those discussed in the first embodiment, will be, indicated, by the same reference numerals and will not be discussed redundantly for the sake of simplicity.

Similar to the first embodiment, the armature 60 is radially opposed to the magnets 15 at the location radially inward of the magnets 15. The armature 60 has an armature core 62 that is installed to the rotatable shaft 17 such that the armature core 62 is not axially displaceable relative to the rotatable shaft 17. In the second embodiment, an insulator 63 made of a dielectric resin material is installed to the armature core 62 at a predetermined location. The coils 65 (see FIG. 2 of the first embodiment) are wound around teeth 64 of the armature core 62 through the insulator 63. In FIGS. 7A to 8, the coils 65 are not depicted for the sake of simplicity. As shown in FIGS. 7A to 8, the insulator 63 includes an insulator main body 63*a*, a lower extending portion 63*b* and an upper extending portion 63*c*. The insulator main body 63*a* is interposed between the teeth 64 of the armature core 62 and the coils 65. The lower extending portion 63*b* and the upper extending portion 63*c* extend from the lower and upper sides, respectively, of the insulator main body 63*a* in the direction of the axis L. As shown in FIG. 7B, the lower extending portion 63*b* covers the outer peripheral surface of the lower end portion of the rotatable shaft 17. A distal end part 63*d* of the lower extending portion 63*b* contacts an inner race 26*a* of the ball bearing 18*b*, which is placed in the bearing holding portion 25 of the lower end housing 14, in the direction of the axis L. In this embodiment, the ball bearing 18*b* is axially slidably received in the bearing holding portion 25 of the lower end housing 14 such that a generally cylindrical outer peripheral surface of the outer race 26*b* of the ball bearing 18*b* is axially slidable along a generally cylindrical inner peripheral surface of the bearing holding portion 25. In this instance, the distal end part 63*d* of the lower extending portion 63*b* contacts the inner race 26*a* of the ball bearing 18*b* and does not contact the outer race 26*b* of the ball bearing 18*b* to enable smooth rotation of the insulator 63 with the inner race 26*a* at the time of rotating the rotatable shaft 17. The upper extending portion 63*c* extends to the commutator 19 and covers the outer peripheral surface of the corresponding portion of the rotatable shaft 17.

As discussed above the ball bearing 18*b* is placed to the bearing holding portion 25 of the lower end housing 14, and the ball bearing 18*a* is placed to the bearing holding portion 27 (see FIG. 7C) located at the center part of the upper end housing 13. These ball bearings 18*b*, 18*a* rotatably support the rotatable shaft 17.

The bearing holding portion 25 is configured into the cup shape (i.e., having the bottom wall and the peripheral wall). The thorough hole 25*b* is formed at a base part (support wall) 25*a* of the bearing holding portion 25 to receive the lower end portion of the rotatable shaft 17. Furthermore, a wave washer (serving as a resilient urging member) 28, which is made of a metal material (e.g., spring steel, iron steel), is placed at the base part 25*a* of the bearing holding portion 25 and contacts the outer race 26*b* of the ball bearing 18*b* without contacting the inner race 26*a* of the ball bearing 18*b*. Although FIG. 8 illustrates a wavy configuration of the wave washer 28, this wavy configuration of the wave washer 28 is not illustrated in FIGS. 7A and 7B for the sake of simplicity.

The ball bearing 18*b*, which is installed to the bearing holding portion 25 of the lower end housing 14, is loosely fitted to or lightly press-fitted to the rotatable shaft 17. The words, "loosely fitting" refer to fitting of the ball bearing 18*b* to the rotatable shaft 17 in such a manner that a predetermined radial gap is formed between the ball bearing 18*b* and the rotatable shaft 17, so that the ball bearing 18*b* can be moved relative to the rotatable shaft 17 in the direction of the axis L by, for instance, an own weight of the ball bearing 18*b* The words, "lightly press-fitting" refer to fitting of the ball bearing 18*b* to the rotatable shaft 17 in such a manner that a substantial radial gap does not exist between the ball bearing 18*b* and the rotatable shaft 17, so that the ball bearing 18*b* does not easily move relative to the rotatable shaft 17 in the direction of the axis L by, for instance, the own weight of the ball bearing 18*b*. In comparison to the ordinary secure press-fitting, the loose fitting or, the lightly press-fitting does not require the jig for implementing the press-fitting or requires a smaller size of the jig for the lightly press-fitting. Thereby, it is possible to reduce the manufacturing costs.

Figures 7A, 7B, 7C:
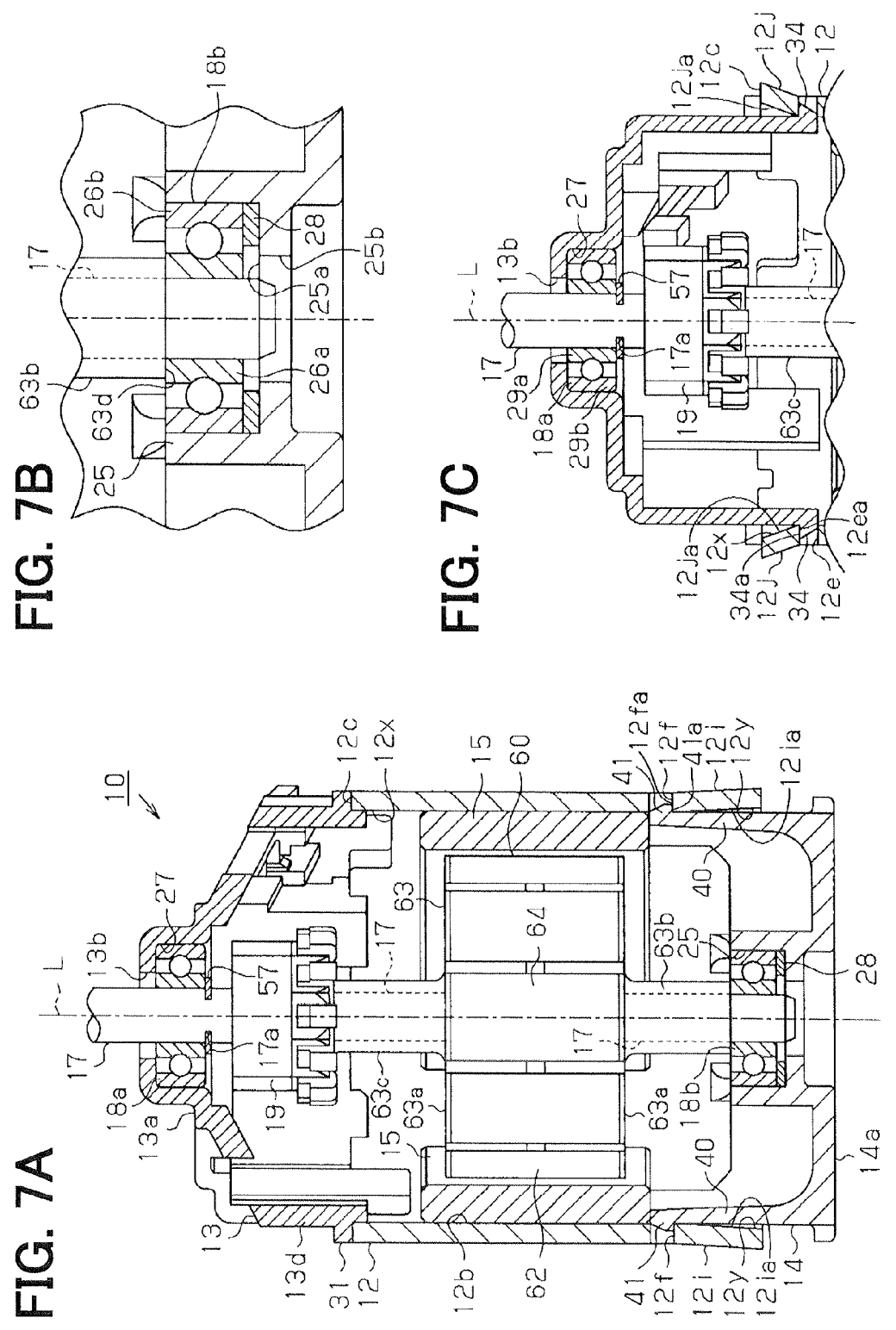

Furthermore, as shown in FIG. 7A or 7C, the commutator 19 is securely installed to the rotatable shaft 17. Also, a groove 17*a* is formed in the rotatable shaft 17 at a predetermined location above the commutator 19 such that the groove 17*a* is radially inwardly recessed at the outer peripheral surface of the rotatable shaft 17. A snap ring (flange) 57 is installed to the groove 17*a*. The snap ring 57 radially outwardly projects from the outer peripheral surface of the rotatable shaft 17. The snap ring 57 limits the movement of the upper ball bearing 18*a*, which is placed in the bearing holding portion 27, in the direction of the axis L. Specifically, an axially inner end of an inner race 29*a* of the upper ball bearing 18*a* contacts the snap ring 57, and an axially inner end of the outer race 29*b* does not directly contact the snap ring 57. An axially outer end of the outer race 29*b* of the upper ball bearing 18*a* contacts a wall of the bearing holding portion 27 of the upper end housing 13, and an axially outer end of the inner race 29*a* is placed at the inner opening end of the receiving hole 13*b* and thereby does not directly contact the wall of the bearing holding portion 27 of the upper end housing 13. Alternatively, the movement of the ball bearing 18*a* in the direction of the axis L may be limited only through secure press-fitting of the ball bearing 18*a* to the rotatable shaft 17.

Next, a process of assembling the components of the dynamo-electric machine 10 of the present embodiment will be described.

In a manner similar to that of the first embodiment, the lower end housing 14 is fitted into the lower opening 12*y* of the yoke housing 12. Then, the magnets 15 are installed to and secured to the inner peripheral surface 12b of the yoke housing 12. Thereafter, each of the spacers 20 is press-fitted between the magnets 15.

Then, the rotatable shaft 17, to which the armature 60 is securely fixed and to which the ball bearings 18b, 18a are lightly press-fitted or loosely fitted, is inserted into the yoke housing 12. At this stage, the lower ball bearing 18b, which is located at the leading end side in the inserting direction, is received in the bearing holding portion 25 of the lower end housing 14. In advance to the receiving of the lower ball bearing 18b into the bearing holding portion 25, the wave washer 28, which contacts the outer race 26b of the lower ball bearing 18b in the direction of the axis L upon the installation, is placed in the base part 25a of the bearing holding portion 25 such that the wave washer 28 is axially placed between the base part 25a of the bearing holding portion 25 and the ball bearing 18b and contacts both of the base part 25a of the bearing holding portion 25 and the outer race 26b of the ball bearing 18b.

Thereafter, in the state where the rotatable shaft 17 is inserted into the receiving hole 13b of the upper end housing 13, the upper end housing 13 is fitted to the upper opening 12x of the yoke housing 12. Specifically, the upper end housing 13 is circumferentially positioned relative to the upper opening 12x of the yoke housing 12 by circumferentially positioning the protrusions 32 of the upper end housing 13 relative to the upper notches 12d of the yoke housing 12, so that the protrusions 32 are axially aligned with the upper notches 12d, respectively. Then, the upper end housing 13 is fitted to the upper opening 12x of the yoke housing 12 such that the axially projecting portions 30a of each of the side walls 30 of the upper end housing 13 is circumferentially placed between the magnets 15, which are held in the yoke housing 12. Then, the protrusions 34 of the side walls 30 are engaged with, i.e., are snap-fitted to the upper through holes 12e of the yoke housing 12 upon being guided by the guide walls 12ja of the insertion portions 12j, respectively. That is, the yoke housing 12 and the upper end housing 13 are assembled together through the snap-fit structure. At this time, the upper ball bearing 18a axially contacts the base part (support wall) of the bearing holding portion 27.

In the dynamo-electric machine 10, the wave washer (press-fitting member) 28 is placed between the outer race 26b of the ball bearing 18b and the base part 25a of the bearing holding portion 25 of the lower end housing 14, and the lower extending portion 63b of the insulator 63, which is rotated integrally with the rotatable shaft 17, contacts the inner race 26a of the ball bearing 18b in the direction of the axis L. Therefore, the lower end housing 14 can be urged by the lower extending portion 63b of the insulator 63 toward the axial side (the lower side) in the direction of the axis L. When the lower end housing 14 is urged toward the lower side by the lower extending portion 63b of the insulator 63 through the ball bearing 18b, a reaction force (upwardly acting force) is exerted from the wave washer 28. This upwardly acting force is applied to the upper end housing 13 through the armature core 62, to which the insulator 63 is installed, the rotatable shaft 17, the snap ring 57 and the upper bearing 18a, so that the upper end housing 13 is urged toward the other axial side (upper side) in the direction of the axis L. When the upwardly acting force of the wave washer 28 is considered as the urging force, the downwardly urging force of the wave washer 28, which acts on the lower end housing 14, becomes a reaction force.

As described above, the forces (the urging force and the reaction force) of the wave washer 28, which are exerted in the opposite axial sides, respectively, of the wave washer 28, are exerted to the snap-fit portions in the engaging direction thereof (i.e., exerted between each of the protrusions 34 and the corresponding one of the upper through holes 12e in the engaging direction thereof and also exerted between each of the engaging protrusions 41 and the corresponding one of the lower through holes 12f in the engaging direction thereof). Specifically, when the upper end housing 13 is installed to the yoke housing 12 through the snap-fitting, the wave washer 28 is axially compressed between the outer race 26b of the lower ball bearing 18b and the base part (support wall) 25a of the bearing holding portion 25 of the lower end housing 14, so that the wave washer 28 exerts the axial urging force to urge the lower ball bearing 18b, the armature 60 and the upper ball bearing 18a against the upper end housing 13. At this time, the upper ball bearing 18a, more specifically, the outer race 29b axially contact the base part (support wall) of the bearing holding portion 27 of the upper end housing 13 to axially urge the upper end housing 13 away, from the lower end housing 14. Thereby, an engaging surface 34a of the engaging part 34 of the upper end housing 13 is axially urged against an engaging surface 12ea of the through hole (engaging part) 12e of the yoke housing 12 by the axial urging force of the wave washer 28 conducted to the upper end housing 13 through the upper ball bearing 18a to enhance the axial engagement therebetween. Furthermore, an engaging surface 12fa of the through hole (engaging part) 12f of the yoke housing 12 is axially urged against an engaging surface 41a of the engaging protrusion 41 of the second end housing 14 by the urging force of the wave washer 28. Therefore, the axial positional deviations of the upper end housing 13 and of the lower end housing 14 relative to the yoke housing 12 in the direction of the axis L can be limited. In this way, it is possible to limit the rattling at the snap-fit portions between the upper end housing 13 and the yoke housing 12 and also between the lower end housing 14 and the yoke housing 12. Thus, it is possible to limit or minimize the generation of the noise at the connection between the yoke housing 12 and the lower end housing 14, which are snap-fitted together, as well as the connection between the yoke housing 12 and the upper end housing 13, which are snap-fitted together.

Next, advantages of the present embodiment will be described.

(1) The yoke housing 12 is configured into the cylindrical tubular body, which is opened at opposed axial ends of the yoke housing 12. The upper and lower end housings 13, 14 are provided to the upper opening 12x and the lower opening 12y, respectively, of the yoke housing 12. In the ball bearings 18b, 18a, which rotatably support the rotatable shaft 17 of the armature 60 relative to the upper and lower end housings 13, 14, the lower extending portion 63b of the insulator 63 of the armature 60 contacts the inner race 26a of the ball bearing 18b in the direction of the axis L, and the wave washer 28, which provides the urging force to urge the outer race 26b of the ball bearing 18b in the direction of the axis L, is provided between the outer race 26b of the ball bearing 18b and the lower end housing 14. The acting forces, which are applied to the wave washer 28 from the ball bearing 18b side thereof and the lower end housing 14 side thereof, are exerted to the snap-fit portions between the upper end housing 13 and the yoke housing 12 in the engaging direction thereof and also exerted to the snap-fit portions between the lower end housing 14 and the yoke housing 12 in the engaging direction thereof (i.e., exerted between each of the protrusions 34 and the corresponding one of the upper through holes 12e in the engaging direction thereof and also exerted between each of the engaging protrusions 41 and the corresponding one of the lower through holes 12f in the engaging direction thereof). As described above, the wave washer 28, which exerts the forces of the opposite directions (the urging force and the reaction force) between the upper end housing 13 and the yoke housing 12 and also between the lower end housing 14 and the yoke housing 12, is placed between the lower end housing 14 and the ball bearing 18*b*. Thereby, the urging action is exerted from the wave washer 28 to each of the upper end housing 13 and the lower end housing 14 to urge each of the upper end housing 13 and the lower end housing 14 away from each other in the direction of the axis L. Thus, with this urging action, the axial positional deviation of each of the upper and lower end housings 13, 14 relative to the yoke housing 12 can be limited, i.e., the rattling at each of the snap-fit structures can be limited.

(2) The upper end housing 13 has the axially projecting portions 30*a*, each of which is circumferentially placed between the magnets 15 fixed to the inner peripheral surface 12*b* of the yoke housing 12 to circumferentially position the magnets 15. As discussed above, each of the axially projecting portions 30*a* of the upper end housing 13 is circumferentially placed between the magnets 15 fixed to the inner peripheral surface 12*b* of the yoke housing 12, so that the circumferential positional deviation of the upper end housing 13 relative to the yoke housing 12 can be limited.

The above-described first and second embodiments of the present invention may be modified as follows.

In the first and second embodiments, the yoke housing 12 and the upper end housing 13 may serve as a first housing portion, and the lower end housing 14 may serves a second housing portion. Also, if desired, the yoke housing 12 and the upper end housing 13 may be formed integrally as a single first housing portion from the magnetic material. Alternatively, the yoke housing 12 and the lower end housing 14 may serve as the first housing portion, and the upper end housing 13 may serve as the second housing portion. Also, if desired, the yoke housing 12 and the lower end housing 14 may be formed integrally as a single first housing portion from the magnetic material.

In the first and second embodiments, the number of the magnets 15 is two. However, the number of the magnets 15 is not limited to two and may be increased to any greater number.

In the first and second embodiments, the spacer 20 is tapered toward its leading end in the inserting direction (installation direction) of the spacer 20. However, the present invention is not limited to this configuration, and the configuration of the spacer 20 may be changed to any desired configuration (e.g., a configuration without the tapering).

In the first and second embodiments, the lower opening 12*y* of the yoke housing 12, which is located on the lower end housing 14 side, is provided with the insertion portions 12*i*, each of which is tapered. However, the present invention is not limited to this configuration, and the configuration of each insertion portion 12*i* may be modified to any other configuration (e.g., a configuration without the tapering).

In the first and second embodiments, the single limiting portion 20*b* is provided in each spacer 20. However, the present invention is not limited to this configuration. For instance, multiple limiting portions 20*b*, each of which has a generally identical shape, may be provided in the spacer 20.

In the first and second embodiments, the limiting portion 20*b* is provided in the spacer 20. Alternatively, the limiting portion 20*b* may be eliminated from the spacer 20, if desired.

In the second embodiment, the wave washer 28 is provided in the lower bearing holding portion 25. However, the present invention is not limited to this. For instance, in addition to the wave washer 28, another wave washer, which is similar to the wave washer 28, may be placed at the upper bearing holding potion 27 in a manner similar to that of the wave washer 28. Alternatively, it is possible to provide only this wave washer at the upper bearing holding portion 27 without providing the wave washer 28 at the lower bearing holding portion 25. In the case where the wave washer is placed at the upper bearing holding portion 27, there may be provided an upper extending portion, which is similar to the lower extending portion 63*b* and projects upwardly from the insulator main body 63*a* of the insulator 63 such that the upper extending portion surrounds the outer peripheral surface of the rotatable shaft 17, and a distal end part of the upper extending portion contacts the upper ball bearing 18*a*. With this construction, the axial urging force (reaction force) can be generated with this wave washer.

In the second embodiment, the ball bearing 18*b* is loosely fitted to or lightly press-fitted to the rotatable shaft 17. However, the present invention is not limited to this. For instance, the ball bearing 18*b* may be securely press-fitted to the rotatable shaft 17. Furthermore, in such a case where the ball bearing 18*b* is securely press-fitted to the rotatable shaft 17, it is possible to change the above construction such that the lower extending portion 63*b* of the insulator 63 and the inner race 26*a* of the ball bearing 18*b* do not contact with each other in the direction of the axis L. That is, the lower extending portion 63*b* and the insulator 63 may be eliminated. In such a case where the insulator 63 is eliminated, dielectric powder (insulation powder) may be applied to the surface of the armature core 62 by, for instance, spraying or coating to implement the electrical insulation.

In the second embodiment, the wave washer 28 is used as the urging member that exerts the axial urging force, which urges the ball bearing 18*b* and the base part 25*a* of the lower end housing 14 axially away from each other. Alternatively, the urging member may be any other resilient member, such as a rubber element, a metal Belleville spring, a metal spring washer, a metal coil spring or the like. Also, the wave washer 28 may be made of a resin material, if desired.

In the first and second embodiments, the magnets 15 are fixed to the inner peripheral surface of the yoke housing 12 by the spacers 20. Alternatively, the magnets 15 may be joined to the inner peripheral surface 12*b* of the yoke housing 12 by a bonding agent. In such a case, the spacers 20 may be provided or may be eliminated depending on its need. For instance, even if the spacers 20 are eliminated from the second embodiment, the wave washer 28 alone can provide a sufficient urging force to limit the generation of the rattling movement discussed above.

In the first and second embodiments, the holes 12*e*, 12*f* of the yoke housing 12 are formed as the through holes. Alternatively, the holes 12*e*, 12*f* may be formed as blind radial holes (i.e., radial recesses), each of which has an opening at the inner peripheral surface 12*b* of the yoke housing 12 and does not penetrate through the peripheral wall of the yoke housing 12. Further alternatively, the holes 12*e*, 12*f* may be provided to the upper and lower end housings 13, 14, and the protrusions 34, 41 may be provided in the yoke housing 12. That is, as long as the upper and lower end housings 13, 14 are axially snap-fitted to the yoke housing 12, the locations of the holes 12*e*, 12*f* and of the protrusions 34, 41 may be chosen depending on its need.

Furthermore, in place of the extending portion 63*b* of the insulator 63, a lower groove, which is similar to the groove 17*a*, may be formed in the rotatable shaft 17 at a location adjacent to the axial inner end of the inner race 26*a*. Then, a snap ring (flange), which is similar to the snap ring 57, may be fitted to this lower groove. In this way, the axial urging force of the wave washer 28 can be conducted from the inner race 26a to the rotatable shaft 17 through this snap ring fitted into the lower groove. Even with this modification, the advantages similar to those discussed in the second embodiment can be achieved.

Furthermore, although the above embodiments illustrate the invention applied in the blower motor, it is possible to apply the present invention in any other types of electric motors having the snap-fit structure(s) discussed above. Also, the present invention is equally applicable to dynamos (generators) having the snap-fit structure(s) discussed above.

Additional advantages and modifications will readily occur to those skilled in the art. The invention in its broader terms is therefore not limited to the specific details, representative apparatus, and illustrative examples shown and described.

What is claimed is:

1. A dynamo-electric machine comprising:
    a casing that includes:
        a first housing portion that supports a first ball bearing and includes an engaging part; and
        a second housing portion that supports a second ball bearing and includes an engaging part, wherein the engaging part of the second housing portion is axially snap-fitted to the engaging part of the first housing portion to couple the second housing portion to one end part of the first housing portion;
    a plurality of permanent magnets that are fixed to an inner peripheral surface of the first housing portion and are spaced from one after another in a circumferential direction;
    an armature that is rotatably placed radially inward of the plurality of permanent magnets and includes a rotatable shaft, the rotatable shaft being rotatably supported by the first ball bearing and the second ball bearing; and
    a resilient urging member that is axially positioned between the second ball bearing and a support wall of the second housing portion to exert an axial urging force, wherein:
    the axial urging force of the resilient urging member urges the second ball bearing and the support wall of the second housing portion axially away from each other;
    the axial urging force of the resilient urging member axially urges the second ball bearing together with the rotatable shaft and the first ball bearing away from the support wall, and the axial urging force of the resilient urging member axially urges the first housing portion away from the second housing portion through the first ball bearing; and
    an engaging surface of the engaging part of the first housing portion is axially urged against an engaging surface of the engaging part of the second housing portion by the axial urging force of the resilient urging member conducted to the first housing portion through the first ball bearing.

2. The dynamo-electric machine according to claim 1, wherein:
    the armature includes:
        an armature core that is secured to the rotatably shaft;
        a dielectric insulator that covers the armature core; and
        a coil that is wound around the armature core through the dielectric insulator;
    the dielectric insulator includes:
        a main body that covers the armature core; and
        an extending portion that axially extends from the main body toward the second ball bearing and axially contacts an inner race of the second ball bearing; and
    the resiliently urging member axially contacts an outer race of the second ball bearing.

3. The dynamo-electric machine according to claim 1, wherein:
    the armature includes:
        an armature core that is secured to the rotatably shaft;
        a dielectric insulator that covers the armature core; and
        a coil that is wound around the armature core through the dielectric insulator;
    an inner race of the second ball bearing is securely press-fitted to the rotatable shaft; and
    the resiliently urging member axially contacts the outer race of the second ball bearing.

4. The dynamo-electric machine according to claim 1, wherein:
    the second housing portion includes a plurality of axially extending portions, each of which axially extends and is circumferentially placed between corresponding adjacent two of the plurality of permanent magnets; and
    the plurality of axially extending portions circumferentially position the plurality of permanent magnets.

5. The dynamo-electric machine according to claim 1, further comprising
    a plurality of spacers, each of which is circumferentially placed between and is press-fitted between corresponding adjacent two of the plurality of permanent magnets, wherein
    each of the plurality of spacers axially contacts a corresponding contact part of the second housing portion to limit axial movement of the corresponding contact part of the second housing portion toward the spacer.

6. The dynamo-electric machine according to claim 5, wherein
    each of the plurality of spacers includes a limiting portion, which is engaged to the inner peripheral surface of the first housing portion to limit the limit axial movement of the corresponding contact part of the second housing portion toward the spacer.

7. The dynamo-electric machine according to claim 6, wherein:
    each of the plurality of spacers includes first and second semicylindrical segments, which are circumferentially placed one after another and are circumferentially joined together at a connection;
    each of the first and second semicylindrical segments of each of the plurality of spacers is radially inwardly convex toward a rotational axis of the armature; and
    the limiting portion of each of the plurality of spacers is provided to the connection between the first semicylindrical segment and the second semicylindrical segment of the spacer.

8. The dynamo-electric machine according to claim 1, wherein:
    the first housing portion includes:
        a yoke housing that has the one end part and the engaging part of the first housing portion and is made of a magnetic material; and
        a first end housing that supports the first ball bearing and is coupled to another end part of the yoke housing, which is axially, opposite from the second housing portion; and
    the second housing portion is a second end housing that is coupled to the one end part of the yoke housing.

9. The dynamo-electric machine according to claim 8, wherein:

the first end housing includes an engaging part that is axially snap-fitted to another engaging part of the yoke housing; and an engaging surface of the engaging part of the first end housing is axially urged against an engaging surface of the another engaging part of the yoke housing by the axial urging force of the resilient urging member conducted to the first housing portion through the first ball bearing.

10. The dynamo-electric machine according to claim 1, wherein a flange, radially outwardly projects from an outer peripheral surface of the rotatable shaft and contacts an axially inner end of an inner race of the first ball bearing to conduct the axial urging force of the resilient member from the rotatable shaft to the first ball bearing and thereby to axially urge the first ball bearing.

* * * * *